United States Patent

Koizumi et al.

[11] Patent Number: 5,883,616
[45] Date of Patent: Mar. 16, 1999

[54] INPUT APPARATUS

[75] Inventors: Yoshiki Koizumi; Masatoshi Uchio, both of Fukushima-ken; Takuro Hatakeyama, Kanagawa-ken, all of Japan

[73] Assignees: Alps Electric Co., Ltd.; Yokohama City Rehabilitation Corporation, both of Japan

[21] Appl. No.: 805,390

[22] Filed: Feb. 24, 1997

[30] Foreign Application Priority Data

Mar. 4, 1996 [JP] Japan ................................. 8-046299

[51] Int. Cl.$^6$ ...................................................... G09G 5/00
[52] U.S. Cl. ........................... 345/156; 345/157; 345/158; 200/1 R; 340/825.19; 340/825.319
[58] Field of Search ..................................... 345/156, 157, 345/158; 340/825.319, 825.19; 273/148 B, 310; 200/1 R

[56] References Cited

U.S. PATENT DOCUMENTS

| | | | |
|---|---|---|---|
| 4,565,999 | 1/1986 | King et al. | 345/158 |
| 4,567,479 | 1/1986 | Boyd | 345/156 |
| 4,713,535 | 12/1987 | Rhoades | 250/221 |
| 4,865,610 | 9/1989 | Muller | 623/24 |
| 5,287,119 | 2/1994 | Drumm | 345/158 |
| 5,310,192 | 5/1994 | Miyake | 463/5 |
| 5,365,026 | 11/1994 | Cromer, Jr. et al. | 200/1 R |
| 5,489,922 | 2/1996 | Zloof | 345/156 |

*Primary Examiner*—Jeffery A. Hofsass
*Assistant Examiner*—Davetta Woods
*Attorney, Agent, or Firm*—Brinks Hofer Gilson & Lione

[57] ABSTRACT

An input apparatus that allows those who are severely physically handicapped for example to enter characters with comparative ease and minimizes the chance of making error entries. The input apparatus comprising: an optical signal transmitter constituted to be worn on the head of an operator and having a plurality of light-emitting elements for transmitting an optical signal and a breath-operated switch; an image display device on which a cursor is shown; and an optical signal receiver connected to the image display device and having a single light-receiving element for receiving the optical signal and a data processor; wherein the optical signal transmitter, when worn on the operator head, transmits, on the optical signal, a data signal containing switch data to be generated when the breath-operated switch is operated, the optical signal receiver generates coordinate data from positional data indicating a shift of the operator head from a predetermined position in the optical signal transmitter and switch data contained in the data signal according to a reception state of the optical signal coming from the optical signal transmitter and supplies the generated coordinate data to the image display device, and the image display device moves a display position of the cursor according to the positional data contained in the coordinate data and selects a display capability according to the switch data contained in the coordinate data.

6 Claims, 5 Drawing Sheets

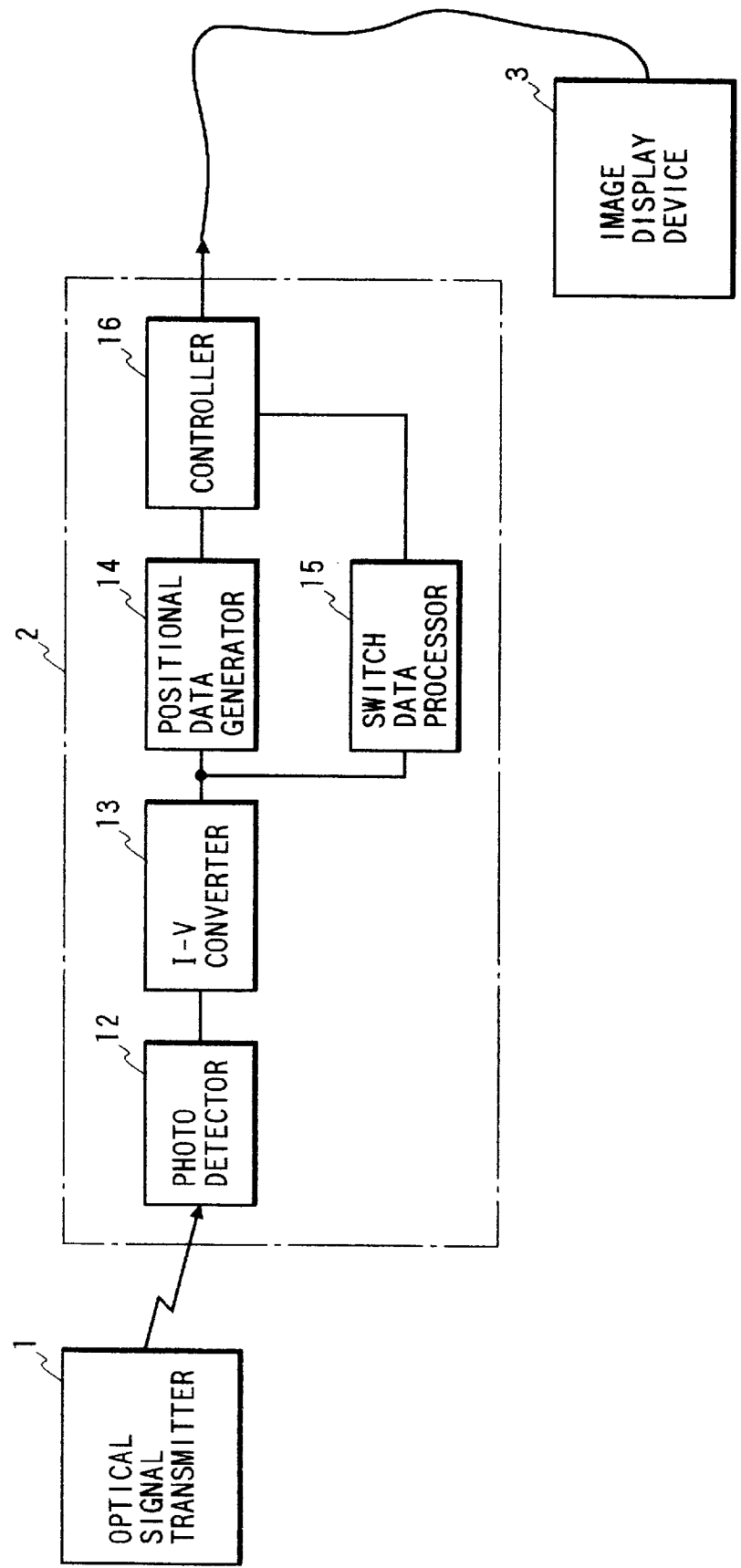

INPUT APPARATUS

BACKGROUND OF THE INVENTION

The present invention relates to an input apparatus and, more particularly, to an input apparatus that allows those who are severely physically handicapped for example to enter characters by shifting their heads and operating a breath-operated switch while looking at an image display device on which entered characters are shown.

A character input apparatus, or a word processor for those who are severely physically handicapped for example is known in which all input operations are performed by blinking of the eye of an operator.

In such a known word processor, a screen on which various characters are regularly arranged is shown on the monitor display and this screen is scanned horizontally with a vertical slit and vertically with a horizontal slit. The operator blinks his or her eye when the vertical slit has reached a column that contains a desired character and blinks his or her eye again when the horizontal slit has reached a row that contains the desired character. Thus, the character located at the intersection of these slits is selected. Repeating these operations, the operator can enter desired characters to form a sentence for example.

Because the known word processor is operated all by the blinking of the eye of the operator, those who are handicapped in the hand for example can also enter characters. However, some operators are in the habit of blinking comparatively often, while others blink unintentionally mainly due to the strain caused by operating the word processor. The improper blinks lead to erroneous entering of characters, requiring frequent cancellation of the erroneously entered characters.

SUMMARY OF THE INVENTION

It is therefore an object of the present invention to provide a character input apparatus that allows those who are severely physically handicapped for example to enter characters with comparative ease and minimizes the chance of making error entries.

In carrying out the invention and according to the first aspect thereof, there is provided an input apparatus comprising: an optical signal transmitter constituted to be worn on the head of an operator and having a plurality of light-emitting elements for transmitting an optical signal and a breath-operated switch; an image display device on which a cursor is shown; and an optical signal receiver connected to the image display device and having a single light-receiving element for receiving the optical signal and a data processor; wherein the optical signal transmitter, when worn on the operator head, transmits, on the optical signal, a data signal containing switch data to be generated when the breath-operated switch is operated, the optical signal receiver generates coordinate data from positional data indicating a shift of the operator head from a predetermined position in the optical signal transmitter and switch data contained in the data signal according to a reception state of the optical signal coming from the optical signal transmitter and supplies the generated coordinate data to the image display device, and the image display device moves a display position of the cursor according to the positional data contained in the coordinate data and selects a display capability according to the switch data contained in the coordinate data.

In this case, the plurality (two or more) of light-emitting elements provided on the optical signal transmitter are arranged such that the light axes of these light-emitting elements have inclinations different from each other and the light-emitting elements are driven sequentially to emit light in a time division manner, generating optical signals.

Thus, according to the first aspect of the invention, the optical signal transmitter is worn on the head of the operator, the operator opposed to the display section of the image display device shifts his or her head from a predetermined position, the displayed cursor moves to the key corresponding to a specified character displayed on the display section of the image display device, the operator turns on the breath-operated switch held in his or her mouth with a predetermined timing, and the characters pointed by the cursor are entered for forming a sentence for example. This novel constitution allows those who are severely physically handicapped for example to perform wordprocessing operation with comparative ease and minimizes the chance of making error entries.

In carrying out the invention and according to the second aspect thereof, there is provided an input apparatus comprising: a first optical signal send/receive device constituted to be worn on the head of an operator and having a single light-receiving element for receiving a transmitted light, a breath-operated switch, a data processor, and a light-emitting element for transmitting an optical signal; an image display device on which a cursor is shown; and a second optical signal send/receive device connected to the image display device and having a plurality of light-emitting elements for emitting lights in a plurality of directions and a light-receiving element for receiving the optical signal; wherein, based on the light transmitted from the second optical signal send/receive device, the first optical signal send/receive device, when worn on the operator head, generates coordinate data from positional data indicating a shift of the operator head from a predetermined position and switch data generated by operating the breath-operated switch and transmits, on the optical signal, the generated coordinate data, and the second optical signal send/receive device supplies the coordinate data contained in the optical signal coming from the first optical signal send/receive device to the image display device, and the image display device moves a display position of the cursor according to the positional data contained in the coordinate data and selects a display capability according to the switch data contained in the coordinate data.

In this case, the plurality (two or more) of light-emitting elements provided on the second optical signal send/receive device are arranged such that the light axes of these light-emitting elements have inclinations different from each other.

Thus, according to the second aspect of the invention, the first optical signal send/receive device is worn on the head of the operator, the operator opposed to the display section of the image display device shifts his or her head from a predetermined position, the cursor displayed on the display section of the image display device moves to the displayed key corresponding to a specified character, the operator turns on the breath-operated switch held in his or her mouth with a predetermined timing, and desired characters are entered for forming a sentence for example. This novel constitution allows those who are severely physically handicapped for example to perform wordprocessing operation with comparative ease and minimizes the chance of making error entries.

The above and other objects, features and advantages of the present invention will become more apparent from the accompanying drawings, in which like reference numerals are used to identify the same or similar parts in several views.

BRIEF DESCRIPTION OF THE DRAWINGS

FIG. 6 is a block diagram illustrating an example of the optical signal transmitter for use on the embodiment of FIG. 1.

DETAILED DESCRIPTION OF THE PREFERRED EMBODIMENTS

This invention will be described in further detail by way of example with reference to the accompanying drawings.

Figure 1:
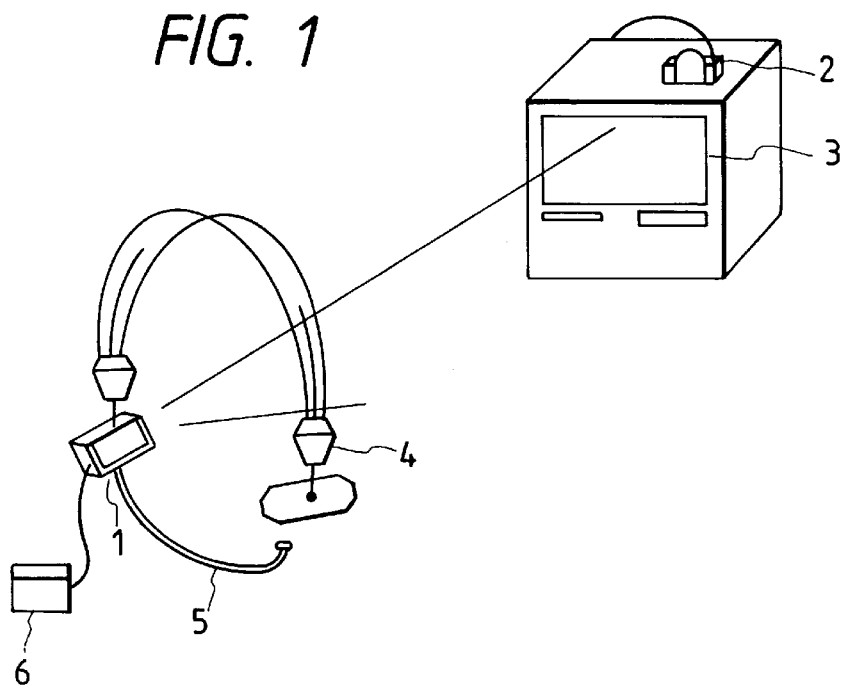
FIG. 1 is a perspective view illustrating the input apparatus practiced as a first preferred embodiment of the present invention.
Figure 2:
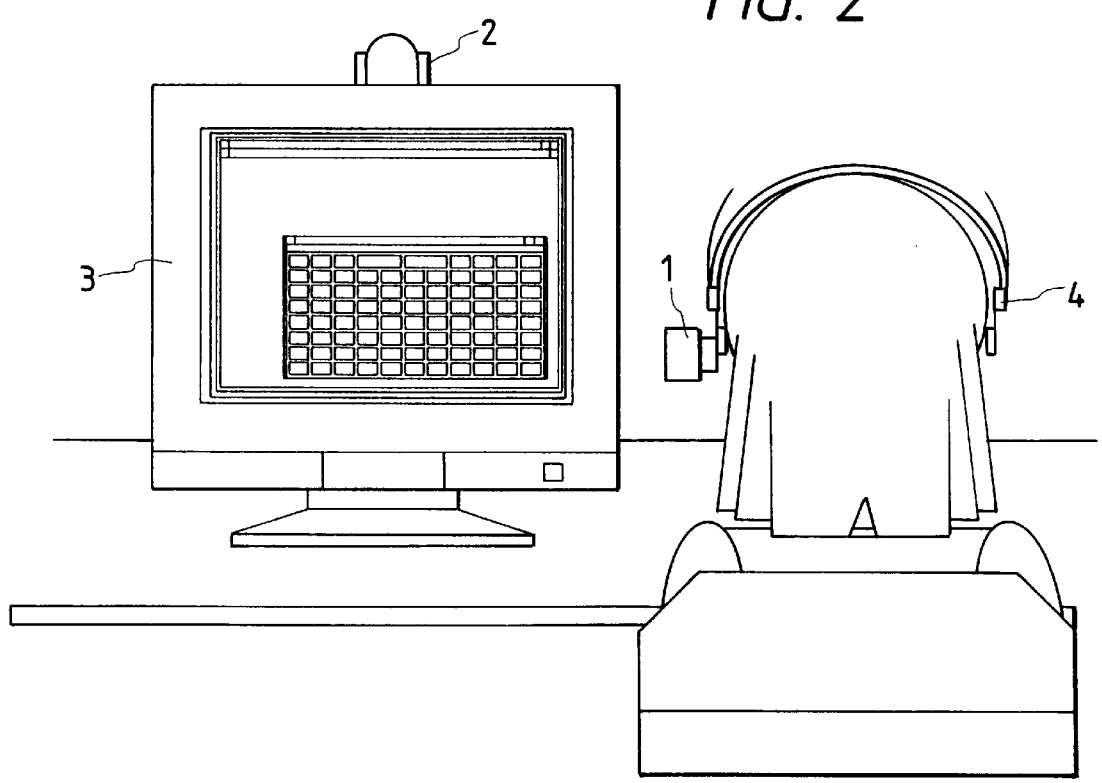
FIG. 2 is a diagram illustrating an example of the usage state of the embodiment of FIG. 1.

FIG. 1 is a perspective view illustrating the general constitution of the input apparatus practiced as the first preferred embodiment of the present invention. FIG. 2 is a diagram illustrating an example of the usage state of the input apparatus of FIG. 1.

Referring to FIG. 1, the input apparatus comprises an optical signal transmitter 1, an optical signal receiver 2, and an image display device 3 composed of a personal computer and the like.

The optical signal transmitter 1 is constituted such that the same is coupled to a headset device 4 to be attached to the head of an operator. A breath-operated switch 5 put in the mouth of the operator for operation and a power supply 6 are connected to the headset, the power supply being connected with a lead wire having no reference symbol. The optical signal receiver 2 is located in the vicinity of, for example, on top the image display device 3 to be connected to the same with a lead wire having no reference numeral. In this case, although not shown in FIG. 1, the optical signal transmitter 1 is provided with a plurality of light-emitting elements for transmitting an optical signal. The optical signal receiver 2 is provided with a single light-receiving element for receiving the optical signal coming from the transmitter. In use, the plurality of light-emitting elements are arranged opposite to the single light-receiving element, so that the optical signal transmitted from the plurality of light-emitting elements is correctly received by the light-receiving element.

As shown in FIG. 2, the operator puts on the optical signal transmitter 1 on his or her head by means of the headset 4 when the input apparatus is used and sits at a position opposing the display monitor of the image display device 3. At this moment, the display monitor of the image display device 3 displays a keyboard with each character and symbol allocated to each of the keys and a cursor that moves over the keyboard.

Figure 3:
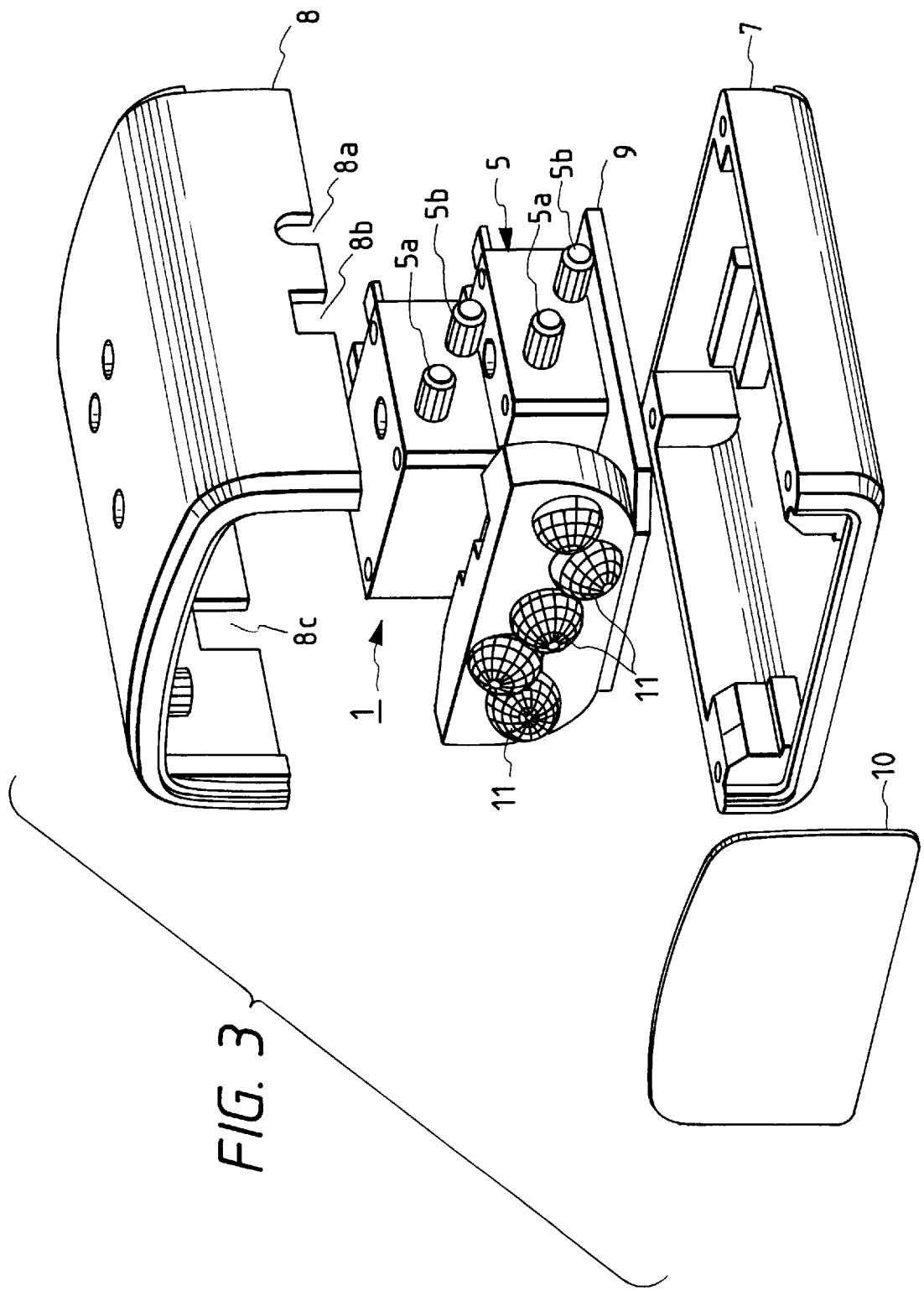
FIG. 3 is a perspective exploded view illustrating an optical signal transmitter for use in the embodiment of FIG. 1.

FIG. 3 is a perspective exploded view illustrating an example of the constitution of the optical signal transmitter 1 for use on the embodiment of FIG. 1.

As shown in FIG. 3, the optical signal transmitter 1 comprises a lower casing 7 having generally a rectangular shape and being open upward, an upper casing 8 having generally a barrel vault shape and being open downward, a flat base plate 9 fixed on the upper side thereof with a breath-operated switch 5 and a light-emitting element holding block 11a, an optical filter 10 for covering the side openings of the lower casing 7 and the upper casing 8, and five light-emitting elements 11 mounted on the light-emitting element holding block 11a.

The lower casing 7 accommodates the base plate 9 fixed with the breath-operated switch 5 and the light-emitting element holding block 11a. The optical filter 10 is engaged with the side opening of the lower casing 7. With the base plate 9 accommodated in the lower casing 7 and the optical filter 10 engaged with the side opening, the upper casing 8 is inserted in the lower casing 7 to form the optical signal transmitter 1 generally shaped in a box.

In this case, the upper casing 8 is provided on the lower side thereof with a first notch 8a through which the tube of the breath-operated switch 5 is passed and a second notch 8b through which the jack of a power supply cord is passed, and a third notch 8c for operating a mode switch. The upper casing 8 is provided at the ceiling surface thereof with a hole for air-pressure regulation, a hole for showing an indicator's light-emitting element, and a hole for operating a switch (all of these holes not referenced). Each of the two breath-operated switches 5 is provided with an external air taking port 5a and an air blowing port 5b.

Figure 4:
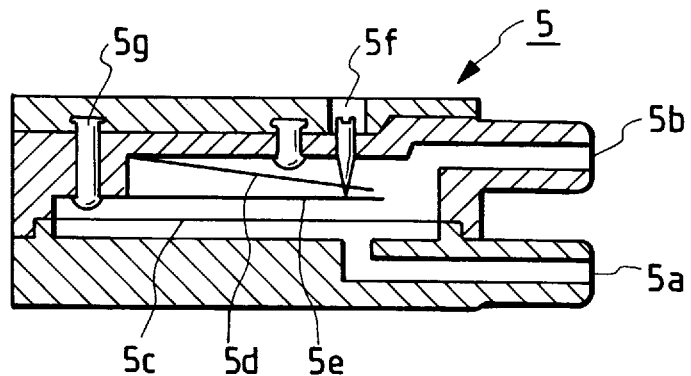
FIG. 4 is a sectional view illustrating an example of the construction of a breath-operated switch for use on the optical signal transmitter of the embodiment of FIG. 1.

FIG. 4 is a cross section illustrating an example of the construction of the breath-operated switch 5 for use on the optical signal transmitter 1 of the embodiment of FIG. 1.

Referring to FIG. 4, the breath-operated switch 5 comprises a first port 5a, a second port 5b, a diaphragm 5c, a contact 5d, a leaf spring 5e, an adjusting screw 5f, and a pair of terminals 5g.

When the input apparatus is in use, the tube, not shown, is connected to the first port 5a or the second port 5b. The tube is connected at one end thereof with an operating port which is put in the mouth of the operator. If the tube is connected to the first port 5a, the second port 5b is made communicate with the outside to apply the atmospheric pressure. When the operator breathes out through the operating port, the diaphragm 5c expands to cause the leaf spring 5e to touch the contact 5d, turning on the switch. If the tube is connected to the second port 5b, the first port 5a is made communicate with the outside to apply the atmospheric pressure. When the operator breathes in through the operating port, the diaphragm 5c is drawn toward the leaf spring 5e to cause the leaf spring 5e to touch the contact 5d, turning on the switch.

The tube is connected to the first port 5a by one breath-operated switch 5 and to the second port 5b by the other breath-operated switch 5. This constitution allows the operator to operate the input apparatus by both of his or her breathing in and breathing out.

Figure 5A:
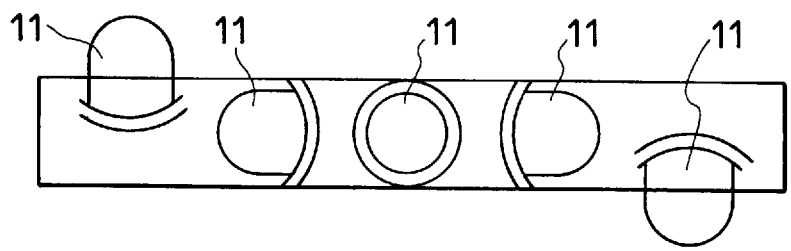
FIG. 5A is a diagram illustrating an example showing the arrangement of a plurality of light-emitting elements for use on the optical signal transmitter of the embodiment of FIG. 1.
Figure 5B:
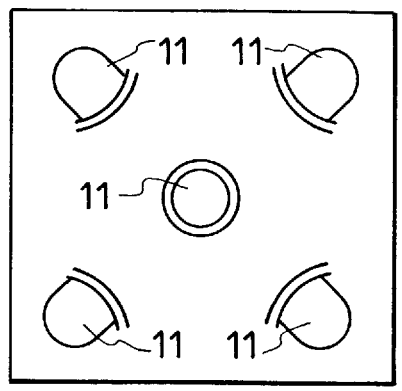
FIG. 5B is a diagram illustrating another example showing the arrangement of the plurality of light-emitting elements for use on the optical signal transmitter of the embodiment of FIG.

FIG. 5A and FIG. 5B illustrate two examples of arrangements of a plurality (five) of light-emitting elements 11 for use on the optical signal transmitter 1 of the embodiment of FIG. 1.

In the example of FIG. 5A, the five light-emitting elements 11 are mounted on the light-emitting element holding block 11a such that the elements 11 are aligned in a row, the optical axis of each element 11 being set in a direction different from each other. To be more specific, the optical axis of the leftmost element is directed generally upward, the optical axis of the element next to the leftmost one is directed generally to the left, the optical axis of the central element is directed generally toward the operator, the optical axis of the element to the right of the central element is directed generally to the right, and the optical axis of the rightmost element is directed generally downward.

In the example of FIG. 5B, the five light-emitting elements 11 are mounted on the light-emitting element holding block 11a such that the elements are arranged in a square, the optical axis of each element being set in a direction different from each other. To be more specific, the optical axis of the upper-left element is directed generally upper left, the optical axis of the lower-left element is directed generally lower left, the optical axis of the upper-right element is directed generally upper right, the optical axis of the lower-right element is directed generally lower right, and the optical axis of the central element is directed generally toward the operator.

FIG. 6 is a block diagram illustrating an example of the optical signal receiver 2 for use on the embodiment of FIG. 1.

As shown in FIG. 6, the optical signal receiver 2 comprises a light-receiving element 12, a current-voltage converter (I–V converter) 13, a positional data generator 14, a switch data processor 15, and a controller 16.

The light-receiving element 12 receives an optical signal coming from the optical signal transmitter 1 and is connected to the input of the current-voltage converter 13. The output of the current-voltage converter 13 is connected to the input of the positional data generator 14 and the input of the switch data processor 15. The output of the positional data generator 14 and the output of the switch data processor 15 are both connected to the controller 16 of which output is connected to the image display device 3 through a connection wire.

Figure 7:
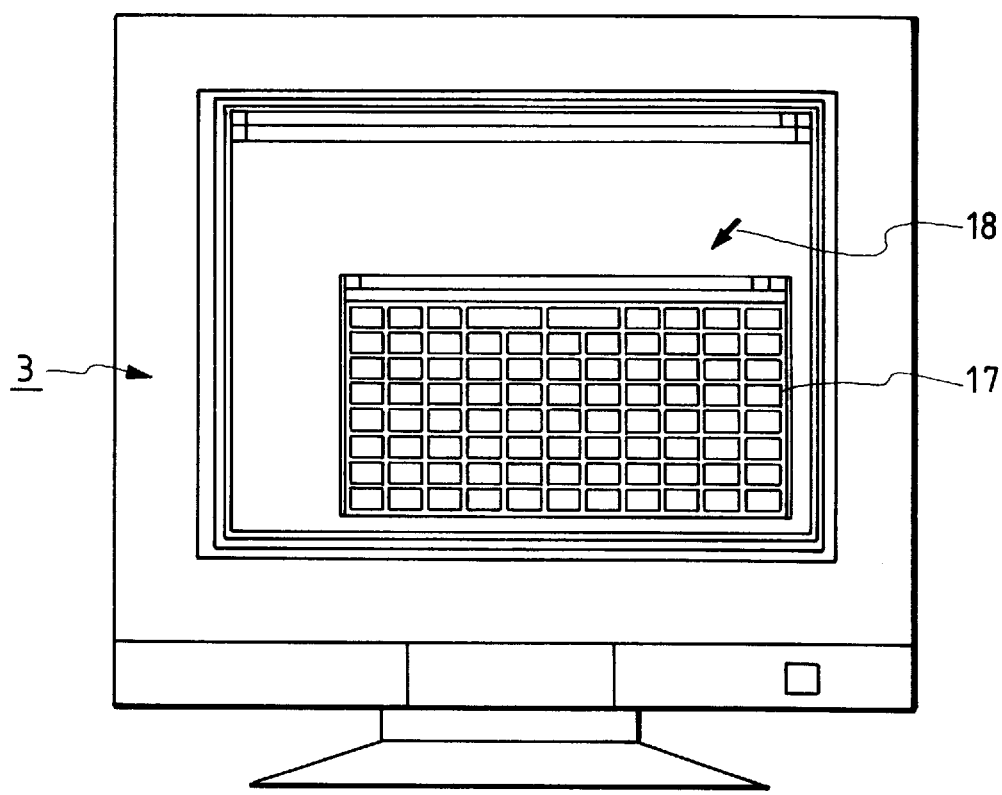
FIG. 7 is a diagram illustrating an example of the image displayed on the display monitor of an image display device of the embodiment of FIG. 1.

FIG. 7 illustrates an example of a display image shown on the display section of the image display device 3 in the embodiment of FIG. 1.

As shown in FIG. 7, when the input apparatus is in use, the display section of the image display device 3 shows at least a keyboard 17 of which keys are allocated with characters and symbols and a cursor 18.

The following describes the operation of the input apparatus practiced as the first preferred embodiment of the invention with reference to FIGS. 1 through 7.

It should be noted that, in the following description, the arrangement of the five light-emitting elements 11 aligned in a row, namely as shown in FIG. 5A is used for convenience of the description.

When entering characters by use of the word processor, the operator puts on the optical signal transmitter 1 on his or her head by means of the headset 4, puts the operating port of the breath-operated switch 5 held in his or her mouth, and sits at a position opposite to the display section of the image display device 3. At this moment, the surface on which the five light-emitting elements 11 are arranged on the optical signal transmitter 1 is opposed to the surface on which the light-receiving element 12 of the optical signal receiver 2 is arranged.

When the optical signal transmitter and the image display device 3 are powered on, the keyboard 17 and the cursor 18 appears on the display section of the image display device and the five light-emitting elements 11 are driven one by one sequentially between the optical signal transmitter 1 and the optical signal receiver 2, and each driven light-emitting element 11 generates an optical signal, which is transmitted to the light-receiving element 12 of the optical signal receiver 2.

To select (or enter) a character (the first character) allocated to one key (hereinafter referred to as the first key) on the keyboard 17 shown on the display section of the image display device 3, the operator horizontally moves his or her head to move the cursor 18 shown on the display section from the current position onto the first key. For example, if the first key is located to the left of the current position, the operator horizontally moves the head toward the left. Accordingly, the optical signal transmitter 1 horizontally moves to the left, the surface on which the five light-emitting elements 11 are arranged also moving to the left. Consequently, the light-receiving element 12 in the optical signal receiver 2 receives more light coming from the light-emitting elements arranged to the right than that coming from the light-emitting elements arranged to the left.

Then, the optical signal receiver 2 takes the optical signal received by the light-receiving element 12 as a current signal. The current signal is converted by the current-voltage converter 13 into a voltage signal. Based on the voltage signal, the positional data generator 14 generates the positional data that represents the movement of the operator head from the current position to the left. The controller 16 converts the supplied positional data to coordinate data to supply the same to the image display device 3. Based on the coordinate data, the image display device 3 moves the cursor 18 shown on the display section from the current position to the left.

When, in this state, the cursor 18 shown on the display section of the image display device 3 reaches the first key, the operator breathes in or out through the operating port of the breath-operated switch 5 held in his or her mouth, upon which the breath-operated switch 5 in the optical signal transmitter 1 is turned on. When the breath-operated switch 5 is turned on, the optical signal transmitter 1 generates switch data (namely switch-on data) and transmits the switch data signal from the five light-emitting elements 11 through an optical signal.

The optical signal receiver 2 receives the optical signal containing the switch data signal at the light-receiving element 12 to take the received optical signal as a current signal. The current-voltage converter 13 converts the current signal into a voltage signal. The switch data processor 15 checks the voltage signal for the switch data then supplies the switch data to the controller 16. The controller 16 converts the supplied switch data into coordinate data and supplies the same to the image display device 3. Based on the supplied coordinate data, the image display device 3 determines that the first key pointed by the cursor 18 shown on the display section has been operated, upon which the character (the first character) allocated to the first key is entered for forming a sentence for example.

The operator selects (namely enters) a second character in the same procedure as that for entering the first character. That is, the operator moves his or her head to move the cursor 18 to the key allocated with the second character on the keyboard 17 shown on the display section of the image display device 3. When the cursor 18 has reached the second key, the operator turns on the breath-operated switch 5, upon which the second character is entered for forming a sentence for example. The operator selects (namely enters) a third character in the same manner.

Thus, according to the present embodiment, the operator puts the optical signal transmitter 1 on his or her head and sits opposed to the image display device 3 and moves the head from a predetermined position. By so doing, the cursor 18 moves on a desired character or symbol shown on the display section of the image display device 3, and operator can enter the desired character by turning on the breath-operated switch 5 held in his or her mouth. This novel constitution comparatively simplifies a character entry operation and minimizes the chance of entering erroneous characters.

In the above-mentioned embodiment, the number of light-emitting elements 11 provided on the optical signal transmitter 1 is five and these five light-emitting elements are aligned in a row. It will be apparent that the number of light-emitting elements is not limited to five; the number may be three or more. It will be also apparent that the light-emitting elements 11 may be aligned in any other manner if the elements emit lights up and down and left and right with uniformity; for example, the arrangement shown in FIG. 5B may be used.

In the above-mentioned embodiment, the plurality of light-emitting elements 11 are provided on the optical signal transmitter and the single light-receiving element 12 is provided on the optical signal receiver 2. In a second preferred embodiment of the invention, the optical signal transmitter 1 may be changed to a first optical signal send/receive device and the optical signal receiver 2 may be changed to a second optical signal send/receive device. The first optical signal send/receive device is provided with a single light-receiving element having a divided light-receiving section for receiving a transmitted optical signal, a breath-operated switch, a data processor, and a light-emitting element for transmitting an optical signal. The second optical signal send/receive device is provided with a plurality of light-emitting elements for generating a light to be transmitted and a light-receiving element for receiving the optical signal.

In the above-mentioned second embodiment, the first optical signal send/receive device is worn on the head of the operator. When the first optical signal send/receive device is on the head of the operator, the first optical signal send/receive device receives at the single light-receiving element thereof the light emitted from the plurality of light-emitting elements on the second optical signal send/receive device in a plurality of directions. Based on the received light, the data processor generates coordinate data from positional data that indicates an offset of the operator head from a predetermined position and switch data generated by the operation of the breath-operated switch. The generated coordinate data is transmitted from the light-emitting element for optical signal transmission to the second send/receive device by means of an optical signal. Receiving the optical signal coming from the first optical signal send/receive device at the light-receiving element for optical signal reception, the second optical signal send/receive device extracts the coordinate data from the received optical signal and supplies the extracted coordinate data to the image display device. Based on the positional data contained in the coordinate data, the image display device moves the cursor accordingly to the displayed key corresponding to a specified character for forming a sentence for example in the same manner as the above-mentioned first embodiment.

Thus, according to the above-mentioned second embodiment, the first optical signal send/receive device is worn on the head of the operator, the operator opposed to the display section of the image display device shifts his or her head from a predetermined position, the cursor displayed on the display section of the image display device moves to the displayed key corresponding to a specified character, the operator turns on the breath-operated switch held in his or her mouth with a predetermined timing, and a desired character is entered for forming a sentence for example. This novel constitution allows those who are severely physically handicapped for example to perform wordprocessing operation with comparative ease and minimize the chance of making error entries.

Further, the above-mentioned two embodiments may be provided with a capability of providing various display functions required by personal computer input operation when the breath-operated switch 5 is operated, in addition to the specification of characters.

As described and according to the first aspect of the invention, the optical signal transmitter is worn on the head of the operator, the operator opposed to the display section of the image display device shifts his or her head from a predetermined position, the displayed cursor moves to the key corresponding to a specified character displayed on the display section of the image display device, the operator turns on the breath-operated switch held in his or her mouth with a predetermined timing, and the character pointed by the cursor is entered for forming a sentence for example. This novel constitution allows those who are severely physically handicapped for example to perform wordprocessing operation with comparative ease and minimizes the chance of making error entries.

As described and according to the second aspect of the invention, the first optical signal send/receive device is worn on the head of the operator, the operator opposed to the display section of the image display device shifts his or her head from a predetermined position, the cursor displayed on the display section of the image display device moves to the displayed key corresponding to a specified character, the operator turns on the breath-operated switch held in his or her mouth with a predetermined timing, and a desired character is entered for forming a sentence for example. This novel constitution allows those who are severely physically handicapped for example to perform wordprocessing operation with comparative ease and minimizes the chance of making error entries.

While the preferred embodiments of the present invention have been described using specific terms, such description is for illustrative purposes only, and it is to be understood that changes and variations may be made without departing from the spirit or scope of the appended claims.

What is claimed is:

1. An input apparatus comprising:
    an optical signal transmitter constituted to be worn on the head of an operator and having a plurality of light-emitting elements for transmitting an optical signal and a breath-operated switch, said breath operated switch having at least two ports, one of said ports being used when the operator breaths out therethrough to activate said breath-operated switch, and another of said ports being used when the operator breaths in therethrough to activate said breath-operated switch;
    an image display device on which a cursor is shown; and
    an optical signal receiver connected to said image display device and having a single light-receiving element for receiving said optical signal and a data processor;
    wherein said optical signal transmitter, when worn on the operator head, transmits, on said optical signal, a data signal containing switch data to be generated when said breath-operated switch is operated, said optical signal receiver generates coordinate data from positional data indicating a shift of the operator head from a predetermined position in said optical signal transmitter and switch data contained in said data signal according to a reception state of said optical signal coming from said optical signal transmitter and supplies the generated coordinate data to said image display device, and said image display device moves a display position of said cursor according to the positional data contained in said coordinate data and selects a display capability according to the switch data contained in said coordinate data.

2. The input apparatus according to claim 1, wherein the plurality of light-emitting elements are more than one light-emitting elements of which light axes have inclinations different from each other and said plurality of light-emitting elements are driven sequentially.

3. An input apparatus comprising:

a first optical signal send/receive device constituted to be worn on the head of an operator and having a single light-receiving element for receiving a transmitted light, a breath-operated switch, a data processor, and a light-emitting element for transmitting an optical signal;

an image display device on which a cursor is shown; and a second optical signal send/receive device connected to said image display device and having a plurality of light-emitting elements for emitting lights in a plurality of directions and a light-receiving element for receiving said optical signal;

wherein, based on the light transmitted from said second optical signal send/receive device, said first optical signal send/receive device, when worn on the operator head, generates coordinate data from positional data indicating a shift of the operator head from a predetermined position and switch data generated by operating said breath-operated switch and transmits, on said optical signal, the generated coordinate data, and said second optical signal send/receive device supplies the coordinate data contained in said optical signal coming from said first optical signal send/receive device to said image display device, and said image display device moves a display position of said cursor according to the positional data contained in said coordinate data and selects a display capability according to the switch data contained in said coordinate data.

4. The input apparatus according to claim 3, wherein said plurality of light-emitting elements on the second optical signal send/receive device are more than one light-emitting elements of which light axes have inclinations different from each other.

5. An input apparatus comprising:

an optical signal transmitter constituted to be worn on the head of an operator and having a plurality of light-emitting elements for transmitting an optical signal and a breath-operated switch;

an image display device on which a cursor is shown; and an optical signal receiver connected to said image display device and having a single light-receiving element for receiving said optical signal and a data processor;

wherein said optical signal transmitter, when worn on the operator head, transmits, on said optical signal, a data signal containing switch data to be generated when said breath-operated switch is operated, said optical signal receiver generates coordinate data from positional data indicating a shift of the operator head from a predetermined position in said optical signal transmitter and switch data contained in said data signal according to a reception state of said optical signal coming from said optical signal transmitter and supplies the generated coordinate data to said image display device, and said image display device moves a display position of said cursor according to the positional data contained in said coordinate data and selects a display capability according to the switch data contained in said coordinate data; and wherein said image display device displays a keyboard of which keys are allocated with characters and symbols, said cursor moves on said keyboard according to said positional data, and said breath-operated switch is operated when said cursor has reached a desired character or symbol to enter the same for forming a sentence.

6. The input apparatus according to claim 3, wherein said image display device displays a keyboard of which keys are allocated with characters and symbols, said cursor moves on said keyboard according to said positional data, and said breath-operated switch is operated when said cursor has reached a desired character or symbol to enter the same for forming a sentence.

* * * * *